United States Patent Office 3,043,534
Patented July 10, 1962

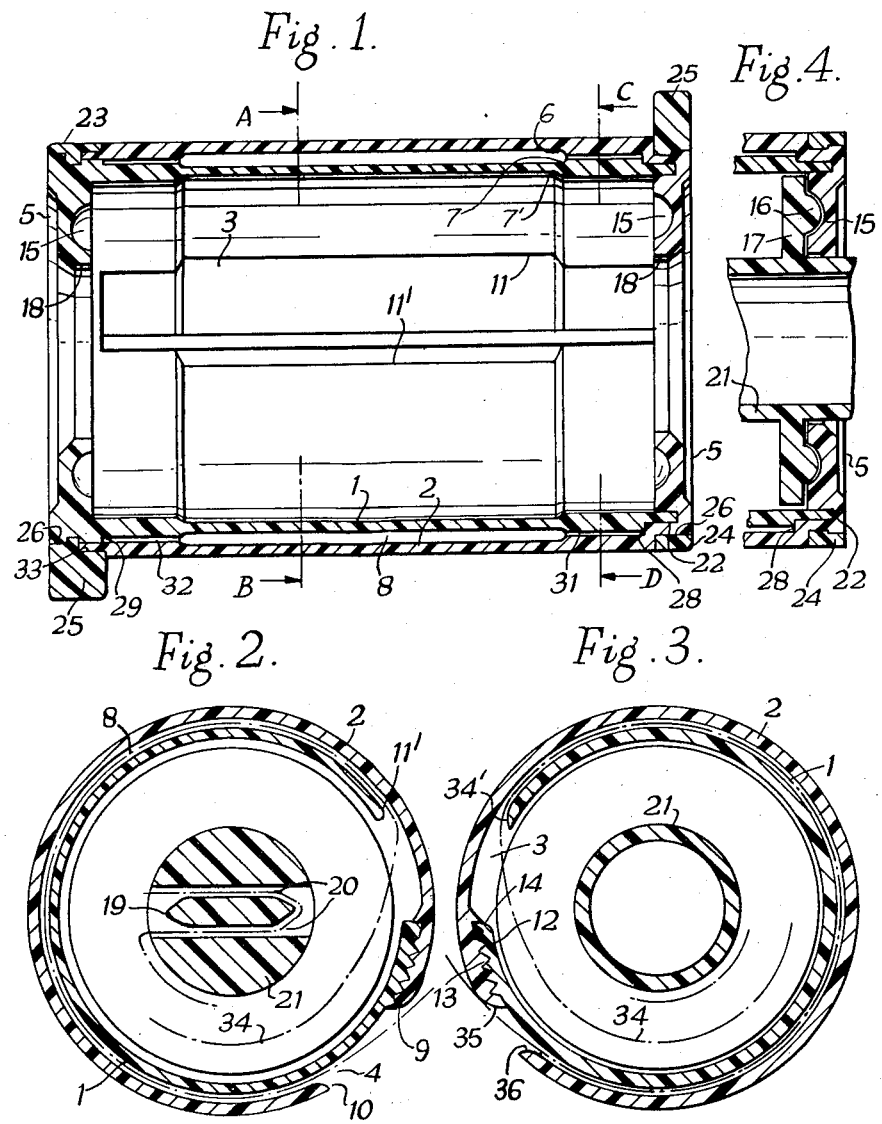

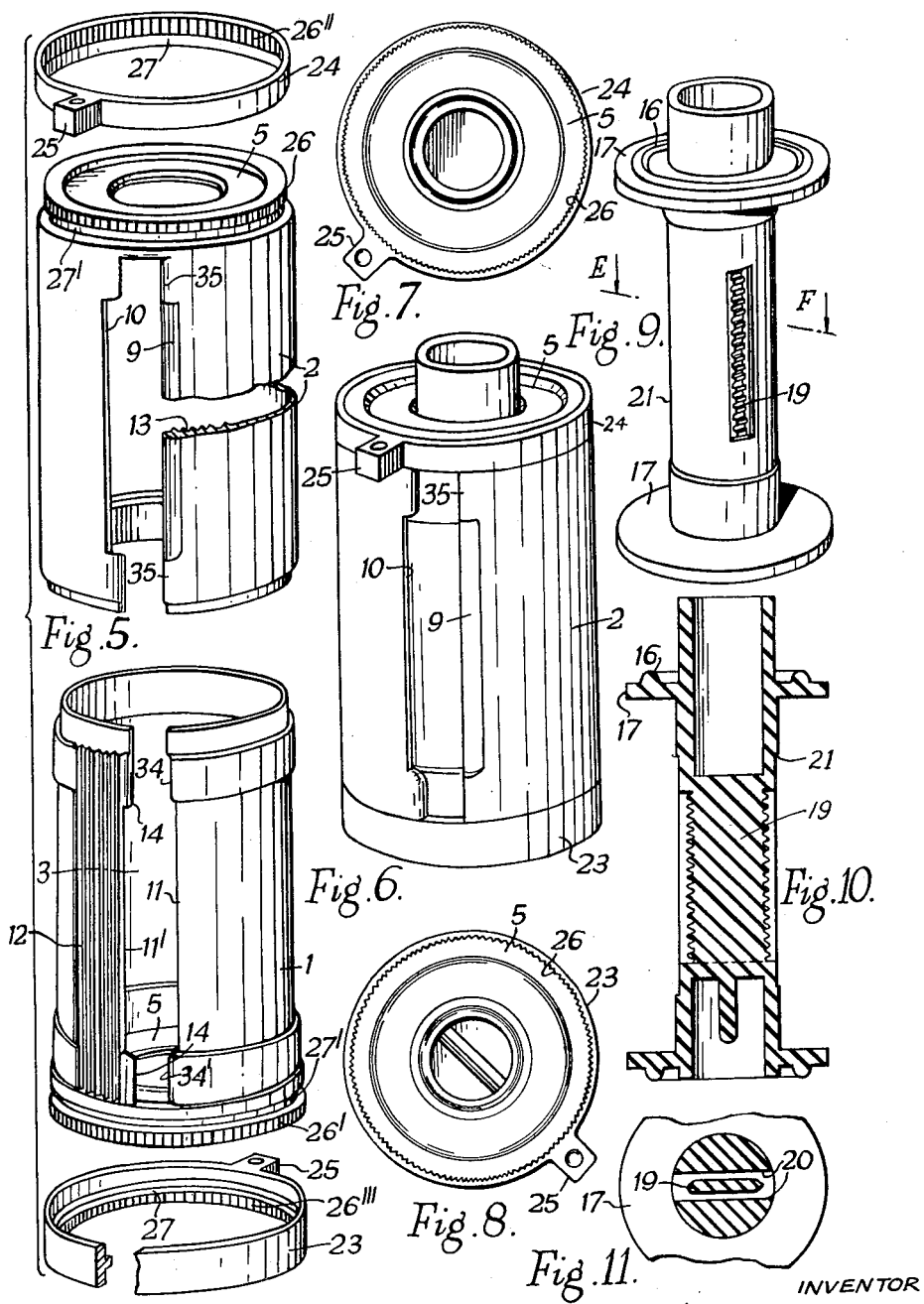

3,043,534
PHOTOGRAPHIC FILM CASSETTES OR CONTAINERS
Rudolf Norris Hejnochowicz, London, England, assignor to Ralph Norris Limited, London, England, a British company
Filed Aug. 22, 1958, Ser. No. 756,719
Claims priority, application Great Britain Aug. 23, 1957
3 Claims. (Cl. 242—71.1)

The present invention is primarily concerned with photographic film cassettes and spools for use therewith but is also applicable to containers for holding bulk film.

The chief object of the invention is to provide an improved construction of cassette or container with which there will be no possibility of either the inner or outer surface of the film being scratched or abraded over the exposure area.

Further objects of the invention are to provide a cassette or container which can be easily manufactured from metal by die-casting or moulded from a suitable thermohardening or thermo-plastic synthetic resin composition, which will be exceptionally light-proof and wherein the component parts of the cassette or container can be easily and accurately assembled together.

Still further objects are to provide a cassette which can be used with all standard 35 mm. cameras, which can be used both as a normal cassette and as a take-up cassette and to provide an improved construction of spool for use with such cassettes.

A cassette or container in accordance with the present invention includes inner and outer shells, which can be assembled together mainly one within the other, to provide an intervening curved film track along which the film may pass into or out of the inner shell, both shells being formed with film entrance-and-exit slots which are held in a determined staggered position, the inner surface of the outer shell and the inner and outer surfaces of the inner shell being recessed throughout their circumferential lengths over a width equal, or substantially equal to, the width of the exposure area of the film, and the edge of the slot in the inner shell which is at the entrance to the film track and the edge of the slot in the outer shell which forms the cassette mouth being recessed over a like width, so that in use the exposure area of the film will not contact the shells.

Although the invention is to a certain extent applicable to cassettes or containers which are not provided with a spool, the invention is particularly concerned with cassettes containing a spool and wherein the outer shell can be slid axially off the inner shell for film loading, each shell being closed at its ends except for a central hole through which the extremities of the spool can project, the spool flanges and ends of the components co-operating together to form light traps. If the cassette is not intended to contain a spool, the central holes in the ends of the cassette will not be required.

The invention is illustrated by way of example in the accompanying drawings, in which:

FIGURE 1 is a longitudinal section of a cassette body constructed in accordance with the present invention and drawn to an enlarged scale;

FIGURES 2 and 3 are cross sections on the lines A—B and C—D respectively, in FIGURE 1;

FIGURE 4 is a fragmentary longitudinal section through one end of the cassette showing a spool mounted therein;

FIGURE 5 is an exploded view partly in section, of a cassette body constructed in accordance with the invention, the spool having been removed;

FIGURE 6 is a perspective view of the cassette and spool;

FIGURES 7 and 8 are end elevations looking from opposite ends of the cassette shown in FIGURE 6;

FIGURE 9 is a perspective view of the spool; and

FIGURES 10 and 11 are respectively a longitudinal section of the spool and a cross section on the line E—F in FIGURE 9.

The cassette illustrated includes two main components, namely an inner shell 1 and an outer shell 2. The inner shell 1 is formed with a longitudinally arranged slot 3 whilst the outer shell 2 is formed with a longitudinally arranged slot 4. Each shell includes an integral end wall 5 and the two shells are assembled together one within the other by sliding the outer shell over the inner shell into a position in which the slots 3 and 4 are staggered relative to one another.

The inner surface of the outer shell is recessed at 6, whilst the outer and inner surfaces of the inner shell are recessed at 7 and 7' respectively, the width of the recesses 6, 7 and 7' being equal or very nearly equal to the width of the exposure area of the film. The lateral margins of the film are guided between the parts of the inner and outer shells bordering the recesses and consequently, due to the recessed formation of the inner and outer shells over the exposure area and the formation of the slot edges as will be described later, there is no possibility of either the inner or outer faces of the film contacting the inner and outer shells over the exposure area, thereby preventing any possibility of the important inner or outer surface of the film being scratched or otherwise defaced.

It will be clear from FIGURES 2 and 3 that the inner and outer shells, when assembled one within the other, provide an intervening curved film track 8 along which the film must pass into and out of the inner shell. To prevent any possibility of the inner surface of the film contacting the edge of exit slot 4 in the outer shell, the outer shell 2 is chamfered as at 9, whilst the opposite edge is recessed at 10 to clear the outer surface of the film over the exposure area, the formation of these particular parts being clearly illustrated in FIGURES 5 and 6. The edges of slot 3 in the inner shell are also recessed as at 11 and 11' in FIGURE 1 for a similar purpose.

To maintain the inner and outer shells against relative axial rotation and to provide a zig-zag light trap, the inner shell is formed with a series of longitudinally arranged teeth 12 whilst the outer shell is formed with a series of similar teeth 13 on its inner surface.

To ensure correct interengagement between the two sets of teeth, one tooth, for example an endmost tooth 14 on the inner shell is made of a different size and shape, for example of square section, which tooth is adapted to enter a correspondingly shaped recess formed in the outer shell. In this way the inner and outer shells will be located against relative angular rotation whilst the slots 3 and 4 will be correctly staggered, the interengaging teeth preventing any possibility of light entering between the inner and outer shells. The teeth 12 and 13 extend across substantially the full width of both shells and lie adjacent the mouth of the film entry slot 4. The path of the film is clearly shown in FIGURES 2 and 3, the film being indicated by reference numeral 34.

The cassette is intended to contain a spool which is illustrated in FIGURES 9, 10 and 11. To provide a light trap at each end of the cassette, the end wall 5 of each shell is formed with an annular recess 15, into which enters an annular rib 16 on the spool flange 17, the spool projecting through the end wall by way of a central aperture 18.

The spool, as shown in FIGURES 9 and 11, is formed with a diametrally positioned slot containing a central web 19 positioned therein, which divides the slot into two comparatively narrow slots 20. The web 19 is set back at both edges below the periphery of the spool.

To enable a secure connection to be made between the extremity of the film and the spool, the usual narrow tongue on the end of the film is folded back and inserted through one of the slots 20 around the edge of the web 19 and then back through the other slot 20 as in FIGURE 2, the film being thus very firmly anchored to the spool.

If it is desired that the film should separate from the spool on which it has been wound when the film has been fully exposed, then only one slot is used, the film pulling out of the slot when fully unwound from the spool.

The recessed edges of the web 19 may if desired be serrated as shown in FIGURE 10 to increase the frictional engagement of the film therewith.

It is preferred that the central part of the spool shall be recessed as at 21, to clear the exposure area of the film, thus preventing the exposure area coming into contact with the spool's periphery.

The inner and outer shells 1 and 2 are designed to fit snugly one within the other in true concentric relationship and with this object in view the end wall 5 of the outer component 2 is formed with an internal annular recess 22 in which the extremity of the inner shell is a pressure fit for frictionally holding the two shells together.

In order to locate the cassette within a camera, the inner and outer shells are provided with removable annular rings 23 and 24, each ring being provided with a radial projection 25.

The ring 24 is located on a reduced diameter part of the outer component 2, whilst the ring 23 is passed lengthwise over the inner component 1 into a position in which its outer end lies flush with the outer surface of the end wall thereof.

To locate the rings 23 and 24 in any desired angular position on the shells, serrations 26 are formed, as shown in FIGURE 5, on the reduced diameter part of the outer shell and similar serrations 26' are formed on the inner shell, to engage corresponding serrations 26'' and 26''' on the radially inner surfaces of the two rings and prevent rotational movement of the rings after they have once been correctly positioned on their associated shells, i.e. in a position in which the projections 25 engage the appropriate parts of the camera to prevent rotation of the cassette therein.

Furthermore, each ring 23 and 24 is formed with an annular inwardly directed projection 27 adapted to make an interference fit with a correspondingly shaped annular recess 27' in the shell with which it is to be associated, thereby preventing displacement of each ring in an axial direction from the shell on which it is mounted.

The cassette parts including the spool are preferably moulded from a suitable thermoplastic or thermo-hardening synthetic resin composition, but they may alternatively be die cast from metal or other suitable material or even machined.

It will be appreciated that the foregoing description that the cassette can be adapted to suit any cassette type of camera by suitable angular positioning of the projections 25. The sensitised exposure area of the film will be prevented from contacting the walls of the cassette if the sensitised surface is wound onto the spool on the inside or outside and likewise the back of the film will be similarly protected.

The inner and outer shells 1, 2 are provided respectively with shoulders 28, 29 which form guide surfaces at the inner ends of the recesses 31, 32 for the edges of the film, so that there is no risk of the film jamming and forcing the components apart, thus ensuring smooth running of the film.

An annular recess 33 formed between the inner shell 1 and the ring 23 serves for the reception of the rim portion on the open end of the outer shell 2. The engagement of the rim portions on the open ends of the two shells in the recesses 22 and 33 not only maintains these shells in their correct relative coaxial positions, but also forms light traps to prevent the passage of light past the said rim portions.

The edge portions of the slot 3 on both sides of the recessed edge portion 11 are rounded off externally as at 34' and those of the slot 4 on both sides of the chamfered portion 9 are similarly rounded off at 35.

The corresponding edge portions on each side of the recessed edge 10 are rounded off on the inside as at 36.

The recessed edge 11' is also rounded off as shown in FIGURE 2.

I claim:

1. A photographic film cassette comprising an inner substantially cylindrical shell, a first end-wall integral with said inner shell and having a central spool spindle bearing aperture formed therein, an outer, substantially cylindrical shell, a second end-wall integral with said outer shell adjacent the opposite end of the inner shell and having a central spool spindle bearing aperture formed therein, an annular ring removably carried on the open end of the outer shell and fitting over the periphery of said end wall of said inner shell, and at least one positioning projection integral with and extending radially of said ring.

2. A photographic film cassette according to claim 1 including a further annular ring adapted to fit over the periphery of the end wall of the outer shell and at least one further positioning projection integral with said further annular ring and projecting radially thereof.

3. A photographic film cassette comprising an inner, substantially cylindrical shell, a first end-wall integral with said inner shell, an outer, substantially cylindrical shell coaxial with said inner shell, a second end wall integral with said outer shell, and an annular ring removably carried on the periphery of said end wall of said inner shell, the outer surface of the closed end of said inner shell and at least part of the inner surface of said annular ring co-operating together to provide an annular recess for accommodating the free end of the outer shell whereby the said free end of said outer shell is maintained coaxial with said inner shell.

References Cited in the file of this patent

UNITED STATES PATENTS

| | | |
|---|---|---|
| 2,144,622 | Frost | Jan. 24, 1939 |
| 2,153,573 | Kinloch | Apr. 11, 1939 |
| 2,477,010 | Schmidt | July 26, 1949 |
| 2,729,401 | Italiano | Jan. 3, 1956 |
| 2,759,681 | Rissberger et al. | Aug. 21, 1956 |

FOREIGN PATENTS

| | | |
|---|---|---|
| 514,789 | Germany | Dec. 17, 1930 |
| 850,689 | Germany | Sept. 25, 1952 |